United States Patent [19]

Benning

[11] Patent Number: 4,645,221
[45] Date of Patent: Feb. 24, 1987

[54] ARRANGEMENT OF A CONTAINER ON A VEHICLE

[75] Inventor: Friedrich Benning, Schwetzingen, Fed. Rep. of Germany

[73] Assignee: Deere & Company, Moline, Ill.

[21] Appl. No.: 879,548

[22] Filed: Jun. 24, 1986

Related U.S. Application Data

[63] Continuation of Ser. No. 727,699, Apr. 26, 1985, abandoned.

[30] Foreign Application Priority Data

May 3, 1984 [DE] Fed. Rep. of Germany ....... 3416270

[51] Int. Cl.$^4$ .................... B60R 11/00; B60K 15/08
[52] U.S. Cl. ................................ 280/5 A; 211/81;
211/174; 224/282; 248/286
[58] Field of Search .............. 280/5 A, 5 R, 5 F, 5 D,
280/5 H, 166; 180/69.24, 69.4, 68.5, 69.2;
248/503, 505, 225.31, 285, 286, 287; 414/541,
462; 224/282, 42.06, 42, 45 R, 42.08; 211/71,
81, 96, 98, 102, 103, 105.3, 105.4, 174

[56] References Cited

U.S. PATENT DOCUMENTS

| 1,359,790 | 11/1920 | Campbell | 248/285 |
| 2,621,009 | 12/1952 | Fender | 248/286 |
| 3,677,284 | 7/1972 | Mendez | 280/5 A |
| 4,223,899 | 9/1980 | Krieger | 280/5 A |
| 4,391,379 | 7/1983 | Paffrath | 414/462 |
| 4,493,603 | 1/1985 | Williams | 414/541 |
| 4,564,167 | 1/1986 | Smith | 224/42.45 R |

Primary Examiner—John J. Love
Assistant Examiner—Everett G. Diederiks, Jr.

[57] ABSTRACT

A container such as a fuel tank pivotally mounted on a vehicle for movement between an operation position adjacent the vehicle and an assembly position remote from said vehicle. The pivotal movement is accomplished by having a support for the container threadably engaged with a screw spindle supported on the vehicle. The support can swing about the screw spindle and also be moved vertically along the axis of the screw spindle by rotating said screw spindle. The vertical movement serves to bring the container in or out of mesh with a lock mechanism which avoids a further pivot movement in the operation position.

19 Claims, 3 Drawing Figures

ARRANGEMENT OF A CONTAINER ON A VEHICLE

This application is a continuation of application Ser. No. 727,699, filed Apr. 26, 1985, now abandoned.

BACKGROUND OF THE INVENTION

The invention concerns an arrangement of a container on a vehicle so that it can pivot from an operating position around the longitudinal central axis of a bearing spindle into an installation position.

Containers installed on a vehicle usually serve to hold liquids or gases that are required for the operation of the vehicle. Thus, for example, lubricating oil, coolant, fuel, hydraulic oil or compressed air for a brake unit can be held in a container and removed from it when needed. Since such containers with the materials held in them are usually required as soon as the vehicle is assembled for it to function and be tested, they must often be installed even before the vehicle is painted and before other assembly procedures in the area of the container are completed. Moreover, depending on the location and size of the container, it may happen that it hinders or even blocks access to maintenance points, which is undesirable even after completion of the vehicle.

An arrangement of a container for the fuel of a starter motor of an internal combustion engine is shown in U.S. Pat. No. 2,833,365. This container is mounted on a cowl that is pivoted on the bearing of a motor hood of a tractor. The cowl, with the container, can be swung away from the machine into an installation position in order to install maintenance parts or it can be swung to the machine and fixed in place on the motor hood by a locking device to take up an operating position and remain there during the operation of the tractor.

Such an arrangement of a container assumes that it can be brought into the installation or operation positions by simple rotation, but this is not always possible in a number of design variants and is also not always desirable.

SUMMARY OF THE INVENTION

The task on which the invention is based is to improve the arrangement of the container in such a way that it can be brought to the vehicle in several positions in order to better fit the particular situation.

This task is solved according to the invention by the fact that the container is mounted so that it can be moved in the direction of the longitudinal central axis of the bearing spindle. In this way, the container can, when it pivots from the operating position to the installation position or viceversa, be displaced in another direction so that it undergoes as great a swinging motion as possible and does not collide with pipes, frame parts or brackets in this range of swing. Moreover, it can, without swinging, be brought into a position with respect to the vehicle in which access to maintenance parts is possible or other components can be installed. In particular, in this simple and inventive way, it is possible to bring the container, which is held in the operating position by means of a lock mechanism, into the installation position by lowering it out of the lock mechanism into another position to move it into the installation position. It is thus possible in a simple way to bring the container into the grasp of the lock mechanism, which need not necessarily consist of a special lock mechanism, but may consist entirely of sliding the container into a niche on the vehicle.

Especially in the case of containers with a large capacity that can normally be moved into the right position on the vehicle by a workman only with great difficulty due to their weight, even when empty or only partially full, it is quite advantageous if only for reasons of safety if the container is limited in its freedom of movement on the bearing along the longitudinal axis and the installation problems resulting from gravity are reduced when the container can be pushed toward or away from the contact surface of the vehicle according to the invention. For reasons of installation, it is particularly advantageous if the bearing can be turned to move the container so that a tool powered by compressed air or electricity, such as a wrench, can be used to perform the movement as quickly as possible and thus to shorten installation times, for which the invention provides the bearing with threads and the container engages the bearing by means of corresponding opposing threads. For reasons of safety, the invention also provides that the bearing also be able to be secured against turning.

According to a further suggestion of the invention, the above-described advantageous features can also be achieved if the container engages the bearing by means of a support that permits the movement so that the functions of storage of operating fluids and weight support can be separated. It is thus possible to select a suitable material, e.g., a plastic, for the container for storage of strongly aggressive hydraulic oil, while the support, on the strength of which high demands are placed, can be made of a suitably high-strength steel. In order to hold the container with the weight of its contents, the support is formed, according to the invention, in such a way that it is an angle with two legs, where one leg serves for connection with the container itself, in which case the leg holding the container may itself be designed as a case for the container, which is of great interest particularly in the case of forest work due to the danger from branches. This case can actually be formed so that it fulfills the legal prescriptions with respect to fire resistance for fuel containers.

The design according to the invention is such that the support has a trough and first and second end pieces through which the container is held in the trough. The first end piece engages the pivot axis by means of a guide element and the second end piece can be releasably fastened to the vehicle resulting in a secure attachment of the container to the vehicle.

A secure fastening of the container to the vehicle, according to the invention, is achieved by a lock mechanism consisting of two brackets with a U-shaped cross section that are fixed in a position on the vehicle to receive the container between their legs when the container is moved to the operational position.

In a highly functional way, the movement of the container from the operating position to the installation position is achieved according to the invention by the fact that the guide element is formed as a track with a guideway having a bracket with a threaded hole at its upper end, the bearing is in the form of a screw spindle and can be screwed into the threaded hole, the screw spindle is hung in brackets on the vehicle so that it can rotate and the lock mechanism consists of a carriage bolt that engages the guideway with its head end and is fastened to an angle bracket by means of a nut on its other end and the angle bracket is pivoted on a screw spindle bracket by means of a bolt whose longitudinal axis is coaxial with the longitudinal axis of the spindle.

The arrangement of a container according to the invention is especially useful when the container is an auxiliary fuel tank to the main fuel tank and is connected in series with it, in which case the auxiliary fuel tank can be filled through the main fuel tank and/or the main fuel tank can be emptied through the auxiliary fuel tank.

Some of the above features of the invention can be achieved without further ado by mounting the auxiliary tank below the main fuel tank, since, for example, when the main fuel tank is filled the fuel will run down into the auxiliary tank due to gravity alone and no additional fuel pump will be required.

The above and additional objects and advantages, and the details of construction of a preferred embodiment of the invention, will become apparent to those skilled in the art from a reading of the description of the preferred embodiment when taken in conjunction with the accompanying drawings.

DESCRIPTION OF THE PREFERRED EMBODIMENT

Figure 1:
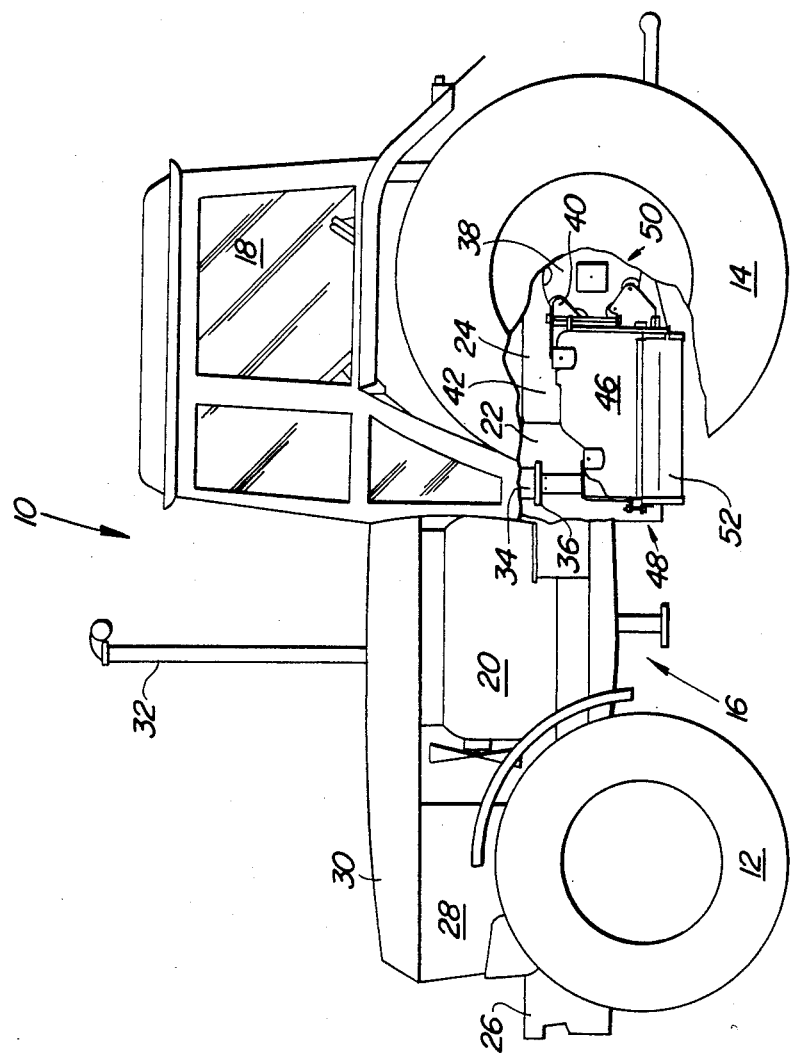
FIG. 1 is a side elevational view of a tractor, cut away in the area of a rear wheel.
Figure 2:
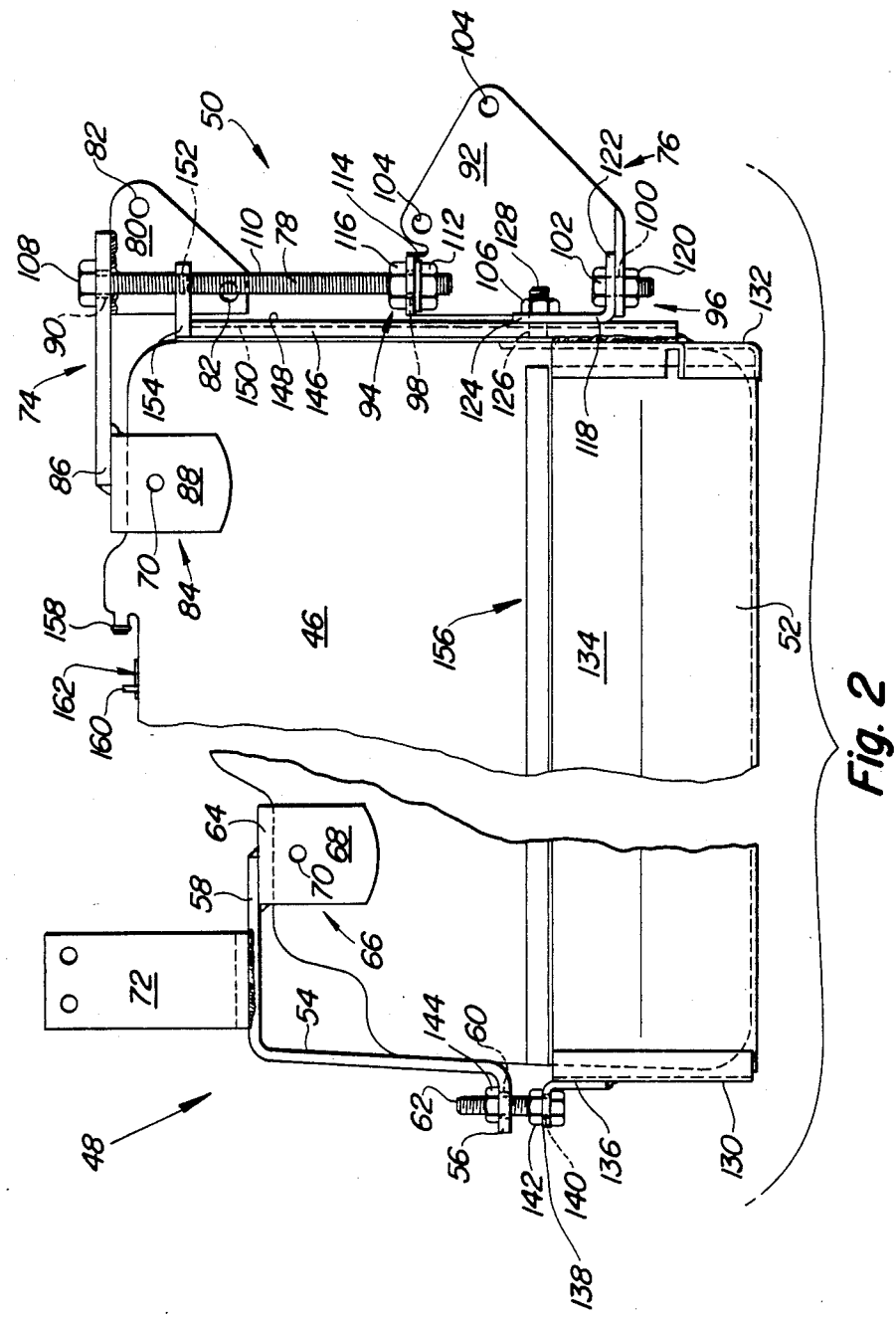
FIG. 2 is an enlarged side elevational view of an auxiliary fuel tank with a front and a rear frame member and a protective trough.

A vehicle illustrated in FIG. 1 is in the form of a tractor having an undercarriage 16 which is supported on front wheels 12 and rear wheels 14. A driver's cab 18 is mounted on the rear of the undercarriage. The undercarriage 16 consists essentially of an unshown front axle bracket which holds the floating front axle, a motor 20, a clutch housing 22 and a gearbox 24. Ballast weights 26 are fastened to the front axle bracket and above this is the front part of the hood 28, which contains a main fuel tank 164, which is only schematically shown in FIG. 3. Between this main fuel tank 164 and the driver's cab 18 is the motor 20, from which an exhaust pipe 32 extends upward through a hood 30. The driver's cab 18 is supported on the undercarriage 16 by several rubber mounts 34, of which only one is visible in FIG. 1. The rubber mount 34 shown is supported on a bracket 36 which, in turn, is bolted to the clutch housing. An axle housing 38, which holds an unshown rotating shaft for the corresponding rear wheel 14, is flanged to the corresponding side surface 42 of the gearbox 24 by a number of bolts 40 arranged in a circle at the rim of the axle housing. Finally, the attachment of an auxiliary fuel tank 46 which is held by a front bracket 48, a rear pivot structure 50 and a protective trough 52, should be noted in FIG. 1. Here, the front bracket 48 is bolted to the bracket 36 for the rubber mount 34, while the rear pivot structure 50 is held by the bolts 40 that fasten the axle housing 38 to the gearbox 24 so that the auxiliary fuel tank 46 extends on the left along the clutch housing 22 and part of the gearbox 24.

The front bracket 48 consists of a piece of flat steel bar 54 bent twice in opposing directions in the same plane with a short lower leg 56 and a long upper leg 58. The short leg is provided with a hole 60 for a bolt 62. At the end of the upper leg 58 is welded the bight 64 of a U-shaped bar 66. The legs 68 (only one of which is visable) grasp the auxiliary fuel container 46 on either side. The leg 68 on the left with respect to the direction of travel has a threaded hole 70 through which a bolt (not shown) can be screwed to hold a protective metal cover, also unshown. A bracket 72 extends upward from the upper leg 58 of the steel bar 54 and serves to fasten the front bracket 48 to the rubber mount by means of unshown bolts.

The rear pivot structure 50 is composed principally of an upper bracket 74, a lower bracket 76 and a positioning screw 78 that serves as a bearing and extends between the two of them. The upper bracket 74 has an approximately triangular plate 80 with two holes 82 through which the corresponding bolts 40 for fastening the axle housing 38 are secured. Welded at a right angle to this plate 80 is a flat steel bar 86 which extends in the direction of the front frame bracket 48 and has a U-shaped bar 84 welded to its forward end. This bar 84 grasps the auxiliary fuel tank 46 with two legs 88 (of which only one can be seen) in the same manner as the legs 68 of the bar 66. The leg 88 of bracket 84 that is away from the gearbox 24 is likewise bored to accept an unshown bolt for mounting the previously mentioned, but not illustrated, cover. The steel bar 86 has a hole 90 in the region of its end where it is welded to plate 80 through which the positioning screw 78 can freely pass, as will be described later. In the installed state, the side of plate 80 toward the gearbox 24 lies against the axle housing 38.

The lower bracket 76 is formed of a plate 92 that is bent away from the gearbox 24 at right angles at the top and bottom in order to form upper and lower pivot bearings 94 and 96 which in turn are pierced by holes 98 and 100, where the upper pivot bearing holds the positioning screw 78 and the lower pivot bearing 96 holds a bolt 102. The plate itself also has two holes 104 which are arranged like the holes 82 in plate 80 so that they align with the corresponding unshown mounting holes in the axle housing 38 and the corresponding bolts 40 for fastening the axle housing 38 can pass through them. The holes 82, 104 in the two plates 80, 92 all lie in the circle of holes for fastening the axle housing 38, so that the bolts 40 secure the axle housings to the gearbox and the plates to the axle housing. In the installed state, the side of plate 92 toward the gearbox 24 also lies against the axle housing 38. The two plates 80, 92 are mounted on the axle housing 38 so that when installed, the centers of hole 90 in the bar 86 of the upper bracket 74, hole 98 of the upper pivot bearing and hole 100 of the lower pivot bearing 96 lie in a vertical line.

The positioning screw 78 is a hex-head bolt with a continuous thread, the length of which is determined by the distance between the upper pivot bearing 94 and the flat steel plate 86 of the upper bracket 74. It should be at least long enough that when it is inserted through the hole 90 in the bar 86 of the upper bracket 74 and its head sits on this, its threaded shaft 110 protrudes beyond the underside of the upper pivot bearing 94 by at least the thickness of a self-locking nut 112 and a washer 114. An additional nut 116 is also screwed onto the threaded bolt 110 and lies above the upper pivot bearing 94 when installed.

The bolt 102 used in the lower pivot bearing 96 makes a pivoting connecting between an angle bracket 118 having two legs 122, 124 and the lower pivot bearing 96, wherein the bolt 102 passes through the one leg 122 and is held on the underside of the lower pivot bearing 96 by a self-locking nut 120. The other leg 124 of the angle bracket 118 also has a hole 126, in which a carriage bolt 128 that serves as a holding element is inserted.

The protective trough 52 is constructed in three pieces and consists of a left end piece 130, a right end piece 132 and a trough element 134 between them. Both end pieces have flanges to connect to the trough element 134 and are either spot welded or soldered at the overlapping points. An angle bracket 136 is attached to the left piece 130 and welded or screwed on and has a horizontal upper leg 138 that is parallel to the lower short leg 56 of the front bracket 48. A hole 140 is provided in the horizontal upper leg 138 in alignment with the hole 60 in the short lower leg 56 to accept the bolt 62. This bolt 62 passes through the hole 140 in the angle bracket 136 and screws into a nut 142 so that when another nut 144 is screwed on at the front bracket 48 it cannot turn. Nut 142 also prevents loss of bolt 62 if the protective trough 52 is not secured at the front bracket 48 by nut 44.

A rectangular tube 146 whose longitudinal axis is parallel to the longitudinal axis of the positioning screw 78 is welded to the right end part 132 and on the side 148 of the tube turned toward the positioning screw is a long slot 150 that extends the entire length of the tube 146. The rectangular tube 146 serves as a guide element and due to its shape can be called a track. Its upper end is closed by a bracket 154 that has a threaded hole 152 and extends between the rectangular tube 146 and the positioning screw 78, so that the positioning screw 78 can be screwed into the threaded hole 152. The lengthwise slot 150 forms a guideway in which slides the carriage bolt 128, whose rounded head cannot be seen in the interior of the rectangular tube 146 and the square section under the head, which is also not shown, comes to lie in the lengthwise slot 150 so that the angle bracket 118 can be clamped in place on the tube 146 by means of the carriage bolt 128 and a nut 106. However, it is also possible to use another sort of guide, such as a rod and clamp or an I-beam with an overlapping clutch. The carriage bolt 128 can be inserted into the slot 150 at the open lower end of the rectangular tube 146. When the carriage bolt 128 is loosened, the rectangular tube 146, and with it the protective trough 52, can be moved generally vertically relative to the rear pivot structure 50 by turning the positioning screw 78, which moves the auxiliary fuel tank 46 away from or toward the bars 66, 84 and thus brings it out of or into their grip.

The trough element 134 is made of bent sheet metal and is folded in the area of its upper end 156 to make a positive connection with the previously mentioned cover. Both the protective cover and the trough element 134 are made of about 3 mm thick sheet steel in order to provide effective protection for the auxiliary fuel tank 46 from forces from outside, for example impacts from branches when working in the woods. Considered schematically, the right end piece 132, the trough element 134 and the rectangular tube 146 form a two-legged support where one leg consists of the rectangular tube 146 and the right end piece 132 and grasps the positioning screw 78, while the other leg consists of the trough element 134.

The auxiliary fuel tank 46 is in the form of a plastic tank, the external form of which can be fitted to the particular local relationships in the area of the gearbox 24 and the clutch housing 22 and which can be positively grasped by the two brackets 66, 84 and the protective trough 52 when installed. In particular, it may have bulges and projections that permit installation of frame members or units that would normally extend into the area of the auxiliary fuel tank. It is provided with a connector 158 for a supply line, an air inlet/outlet connector 160 and a fuel line connector 162 which permit connection to an injection unit 190 shown schematically in FIG. 3 and to the main fuel tank 164.

Figure 3:
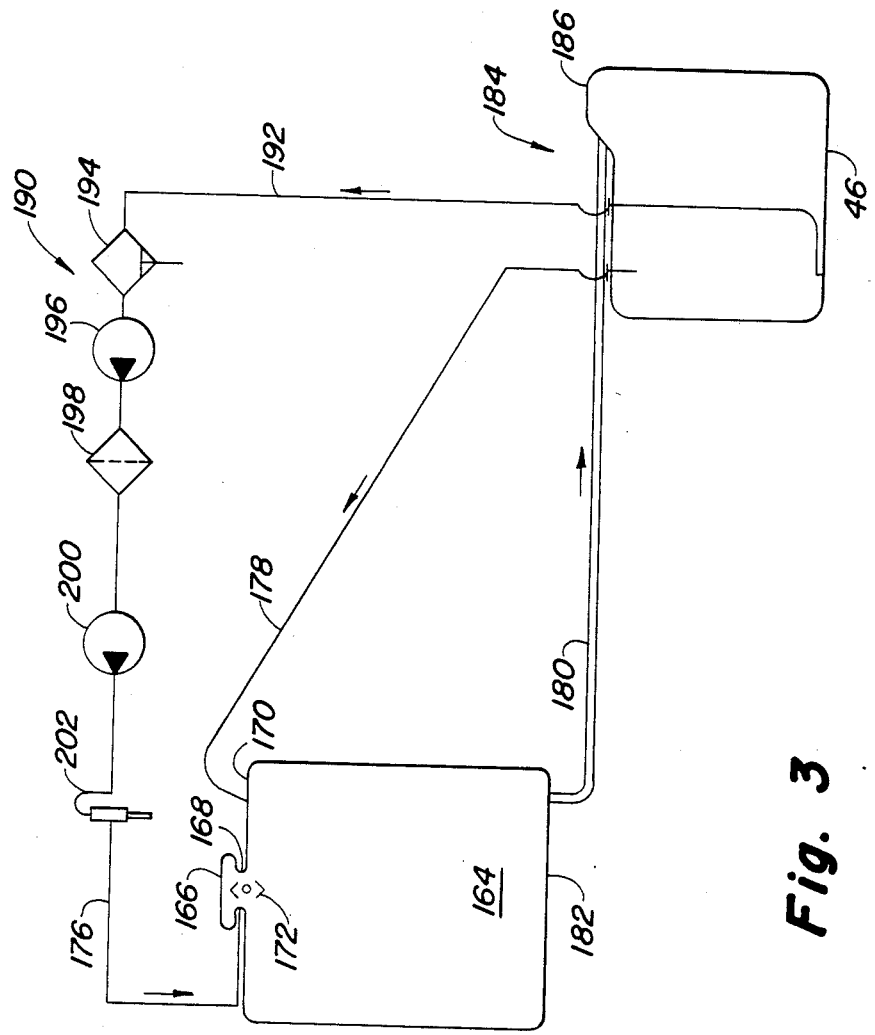
FIG. 3 is a schematic representation of a fuel injection circuit used on the tractor illustrated.

The arrangement and the connection of the main fuel tank 164 with the auxiliary fuel tank 46 can be seen in FIG. 3. When installed, as shown, the main fuel tank 164 is mounted above the auxiliary fuel tank 46 and is provided in conventional fashion with a filler connection 168 and cap 166 on its upper side 170. The cap 166 has an air inlet/outlet valve 172 so that when fuel is removed from the main fuel tank 164 no vacuum can form therein and any overpressure that may form due, for example, to excessive solar radiation can be dissipated. At the height of the filler connection 168 is the opening of a return line 176 and a vent line 178 opens to the top of this main fuel tank 164.

The auxiliary fuel tank 46 has a raised portion 186 in its top 184 where a fuel line 180 coming from the bottom 182 of the main fuel tank opens into the feed line connection 158. The vent line 178 and the fuel line 192 running to the injection unit 190 connect to the auxiliary fuel tank by means of the vent line connector 160 and the fuel line connector 162 respectively. Depending on the design of the fuel tank 164, the vent line 178 could alternatively connect to the return line 176 before it enters the filler connection 168 instead of directly into the top of the main tank. The injection unit 190 is composed of a water separator 194 connected with the fuel line at the input side, and following that, a fuel pump 196, a fuel filter 198, an injection pump 200 and injectors 202, from which the unused fuel is returned to the main fuel tank by means of the return line 176.

The filling and emptying process for the main and auxiliary tanks is as follows. The fuel is first filled into the main tank 164 through the filler connection 168 and flows on directly to the auxiliary fuel tank 46 through the feed line 180; the air in the latter tank can flow through the vent line 178 to the main fuel tank 164 and out into the atmosphere through the air inlet/outlet valve 172. Fuel can be added until the main fuel tank 164 is completely full. Even when the auxiliary fuel tank 46 is already full and fuel is flowing only into the main fuel tank 164, venting continues through the air inlet/outlet valve 172. When the motor 20 of the tractor 10 is started, the fuel pump 196 sucks fuel from the auxiliary tank 46 through the fuel line 192 and the water separator 194 and sends it through the fuel filter 198 to the injection pump, which feeds the injectors 202. Fuel that is not injected by the injectors into the combustion chambers of the motor 20 is returned to the main fuel tank 164 through the return line 176, from which it can be fed again into the injection cycle from the auxiliary tank 46. There accordingly occurs a constant circulation of fuel so that fuel is not allowed to stand for a long time in either fuel tank 46, 164.

The installation of the auxiliary fuel tank 46 is accomplished as follows. Assuming that the front bracket 48 is fastened to the bracket 36 for the rubber mount 34 of the driver's cab 18 and the rear pivot structure 50 is fastened to the axle housing 38, the protective trough 52 is placed in a position where the threaded hole 152 of bracket 154 is aligned with the hole 90 in the bar 86 of the upper bracket 74 and the hole 98 in the upper pivot bearing 94. Then the positioning screw 78 is inserted through the hole 90 in the flat bar 86 of the upper bracket 74, screwed into the threaded hole 152 and turned until it extends about 40 mm on the other side of the bracket 154. Then, the nut 116 is screwed onto the positioning screw 78 until it reaches the underside of the bracket 154 and the positioning screw 78 is inserted into the hole 98 of the upper pivot bearing 94 until its head 108 comes to rest on the upper side of the flat bar 86 of the upper bracket 74. Next, the washer 114 is brought into position against the underside of the upper pivot bearing 94 by the nut 112 so that the positioning screw 78 can still be turned without excessive force. In addition, the angle bracket 118 is attached by means of the carriage bolt 128 to the rectangular tube 146 and secured with nut 106 so that a relative motion between the bracket 188 and the rectangular tube 146 is possible and the angle bracket 118 is placed on the upper side of the lower pivot bearing 96 and secured with the bolt 102 and the self-locking nut 120. At this stage of installation, the entire protective trough 52 can still be pivoted around bolt 102 and the positioning screw 78 either into the operating position or into an installation position away from the gearbox 24 in which the region of the gearbox 24 and the clutch housing 22 that is covered by the auxiliary fuel tank can be painted.

When the protective trough 52 is pivoted into the installation position, the auxiliary fuel tank 46 can be set into it and pivoted back into the operating position alongside the gear box so that it lies underneath the two brackets 66, 84 and the two holes 60, 140 in the short lower leg 56 of the front frame member 48 and in the holding bracket 136 line up. The vent line 178, the feed line 180 and the fuel line 192 are flexible and long enough that they do not prevent the auxiliary fuel tank 46 from pivoting.

In order to bring the auxiliary fuel tank 46 into the grasp of the legs of the bars 66, 84, the positioning screw 78 is then turned, which may be done using a compressed-air powered wrench, so that the protective trough 52 is moved toward the bars 66, 84 by means of the rectangular tube 146, the bracket 154 and the screw connection of the threaded hole 152 with the positioning screw 78. During this movement, the bolt 62 engages the hole 60 in the short lower leg 56 of the front bracket 48, and the carriage bolt 128 slides along in the long slot 150. The positioning process ends when the auxiliary fuel tank 46 is firmly engaged by the bars 66, 84 and the positioning screw 78 can no longer be turned. In order to secure the auxiliary fuel tank 46 in the operating position finally, the bolt 62 is fastened in the front bracket 48 with the nut 144 and the protective trough is thus pressed upward so that the auxiliary fuel tank 46 is firmly located in the bar 66 of the front bracket 48 and the positioning screw 78 is locked by bringing the additional nut 116 onto the upper side of the upper pivot bearing 94 so that loosening and potential downward movement of the protective trough 52 is prevented. Finally, the carriage bolt 128 is tightened by means of the nut 106, so that the rectangular tube 146 and the protective trough 52 are firmly connected to the rear frame member 50. Depending on the working conditions, the previously mentioned protective cover can be attached by bolting it into the holes 70 in the brackets 66, 84.

Having thus described a preferred embodiment of the invention, various modifications thereto will become apparent to those skilled in the art and can be made without departing from the underlying principles of the invention. Therefore, the invention should not be limited to the preferred embodiment but only by spirit and scope of the following claims.

I claim:

1. In the combination of a vehicle, at least one bracket secured to the vehicle, and a container supported by the at least one bracket for pivotal movement about an upright axis between a normal operational position adjacent the vehicle and an installation position spaced from the vehicle, the improvement comprising:
   means acting between the at least one bracket and the container for moving the container generally vertically relative to the at least one bracket in the direction of the upright axis and a lock member secured to the vehicle and extending over the container for engagement with and limiting upward movement of the container, the lock member including a downwardly extending portion which extends along the side of the container when the container is raised while in the operational position and prevents pivotal movement of the container to the installation position.

2. The combination as set forth in claim 1 wherein the lock member is a part of the at least one bracket.

3. The combination as set forth in claim 2 wherein the container is provided with an upwardly extending threaded stud at a position remote from the upright axis, a second bracket is secured to the vehicle and includes a portion provided with a stud receiving opening in a position to receive the stud when the container is raised while in the operational position whereby a nut may be threaded onto the stud to provide additional support for the container when in the raised operational position.

4. The combination as set forth in claim 3 wherein the second bracket includes a lock member extending over the container for engagement with and limiting upward movement of the container, the lock member on the second bracket including a downwardly extending portion which extends along the side of the container when the container is raised while in the operational position and aids the lock member on the at least one bracket in preventing pivotal movement of the container to the installation position.

5. In the combination of a vehicle, a container, and means pivotally mounting the container on the vehicle for movement about an upright axis between an operational position adjacent the vehicle and an installation position spaced from the vehicle, the improvement comprising:
   the means pivotally mounting including means for vertically moving the container between upper and lower positions, and a lock member rigidly secured to the vehicle and extending over the container and having an integral vertical portion which extends along the side of the container remote from the vehicle when the container is in a raised operational position.

6. The combination as set forth in claim 5 wherein the means pivotally mounting includes at least one bracket secured to the vehicle and having three vertically spaced outwardly extending legs, each leg is provided with an opening centered about the upright axis, a first container bracket is secured to the container and extends between the upper and intermediate of the three vertically spaced legs, the first container bracket is provided with a threaded opening centered on the upright axis, a threaded bolt forming the upright axis extends through the openings formed in the upper and intermediate of the three vertically spaced legs, is threaded through the threaded opening in the first container bracket, and has a head resting on the upper surface of the upper of the three vertically spaced legs, a second container bracket is secured to the container for vertical sliding movement relative to the container, extends between the intermediate and lower of the three vertically spaced legs, and is provided with an opening centered on the upright axis, and a pivot member extends through the openings in the second container bracket and the lower of the three vertically spaced legs.

7. The combination as set forth in claim 6 wherein the second container bracket rests on the upper surface of the lower of the three vertically spaced legs and means are provided for locking the second container bracket from movement relative to the container.

8. The combination as set forth in claim 7 further including means for locking the threaded bolt from rotation.

9. The combination as set forth in claim 8 wherein the lock member is formed as part of the at least one bracket.

10. The combination as set forth in claim 9 wherein the container is provided with an upwardly extending threaded stud at a position remote from the upright axis, an additional bracket is secured to the vehicle and includes a portion provided with a stud receiving opening in a position to receive the stud when the container is raised while in the operational position whereby a nut may be threaded onto the stud to provide additional support for the container when in the raised operational position.

11. The combination as set forth in claim 10 wherein the additional bracket includes a lock member extending over the container for engagement with and limiting upward movement of the container, the lock member on the second bracket including a downwardly extending portion which extends along the side of the container when the container is raised while in the operational position and aids the lock member on the at least one bracket in preventing pivotal movement of the container to the installation position.

12. The combination as set forth in claim 6 wherein the container is provided with an upwardly extending threaded stud at a position remote from the upright axis, an additional bracket is secured to the vehicle and includes a portion provided with a stud receiving opening in a position to receive the stud when the container is raised while in the operational position whereby a nut may be threaded onto the stud to provide additional support for the container when in the raised operational position.

13. The combination as set forth in claim 12 wherein the additional bracket includes a lock member extending over the container for engagement with and limiting upward movement of the container, the lock member on the additional bracket including a downwardly extending portion which extends along the side of the container when the container is raised while in the operational position to prevent pivotal movement of the container to the installation position.

14. The combination as set forth in claim 6 wherein said container includes a supporting trough member and a container member positioned within the trough member, an elongated split tubular member forming a guide track has a lower end secured to the trough member and extends upwardly along the container member, the first container bracket is secured to an upper end of the tubular member, a carriage bolt has its head positioned within the tubular member and extends outwardly therefrom through the split, and a nut on the carriage bolt acts in conjunction with the tubular member and carriage bolt to slideably secure the second container bracket to the container.

15. The combination as set forth in claim 14 wherein an upwardly extending threaded stud is secured to the trough member at an end thereof remote from the guide track, an additional bracket is secured to the vehicle and includes a portion provided with a stud receiving opening in a position to receive the upwardly extending stud when the container is raised while in the operational position whereby a nut may be threaded onto the stud to provide additional support for the container when in the raised operational position.

16. The combination as set forth in claim 15 wherein the at least one and additional brackets each include a lock member extending over the container for engagement with and limiting upward movement of the container, each lock member includes a downwardly extending portion which extends along the side of the container when the container is raised while in the operational position to prevent pivotal movement of the container to the installation position.

17. The combination as set forth in claim 16 wherein the downwardly extending portion of each lock member is provided with a threaded opening for receipt of a stud for mounting a container protecting panel.

18. The combination as set forth in claim 17 wherein an upper edge of the trough member is folded to form an upwardly open track which will receive a lower edge of a protective panel secured to the downwardly extending portions of the lock members.

19. The combination as set forth in claim 18 wherein the vehicle further includes an engine, a fuel injection system for the engine, and a fuel tank, the container is mounted on the vehicle in a position below the fuel tank, the container member is an auxiliary fuel tank, a fuel transfer line connects a lower portion of the fuel tank with an upper portion of the auxiliary fuel tank, and the fuel injection system draws fuel from the auxiliary fuel tank.

* * * * *